United States Patent [19]

Yoshida et al.

[11] Patent Number: 5,615,295
[45] Date of Patent: Mar. 25, 1997

[54] OPTICAL FIBER AND PROCESS OF PRODUCING THE SAME

[75] Inventors: Kazuaki Yoshida; Takayuki Morikawa; Takeshi Yagi, all of Tokyo, Japan

[73] Assignee: The Furukawa Electric Co., Ltd., Tokyo, Japan

[21] Appl. No.: 527,559

[22] Filed: Sep. 13, 1995

[30] Foreign Application Priority Data

Sep. 14, 1994 [JP] Japan .................................. 6-220106
Jul. 26, 1995 [JP] Japan .................................. 7-190350

[51] Int. Cl.⁶ .............................. G02B 6/02; G02B 6/36
[52] U.S. Cl. ........................................................ 385/123
[58] Field of Search .................................. 385/123–126, 385/147; 65/30.1, 426, 428, 901

[56] References Cited

U.S. PATENT DOCUMENTS

| | | | |
|---|---|---|---|
| 4,372,645 | 2/1983 | Miller | 385/123 |
| 4,547,210 | 10/1985 | Schneider | 385/401 |
| 4,749,395 | 6/1988 | Schneider | 65/428 |

FOREIGN PATENT DOCUMENTS

| | | |
|---|---|---|
| 59-35034 | 2/1984 | Japan . |
| 3-64707 | 3/1991 | Japan . |

*Primary Examiner*—Akm E. Ullah
*Attorney, Agent, or Firm*—Staas & Halsey

[57] ABSTRACT

A process for the production of an optical fiber a core which is elliptical in cross-section at one end and circular at the other end and which has little transmission loss and less of a reduction in the difference in indexes of refraction between the core and cladding, which consists of heating an optical fiber (1) having a core (c) having a uniform cross-sectional area in the longitudinal direction and a cladding (2) formed with at least one through hole (4A) along the longitudinal direction of the core while successively changing the heating temperature along the longitudinal direction of the optical fiber so as to continuously change the shape of the through hole, continuously change the cross-sectional shape of the core along the longitudinal direction of the optical fiber, and thereby make the cross-sectional shape of the core at one end of the optical fiber and the cross-sectional shape of the core at the other end different.

31 Claims, 11 Drawing Sheets

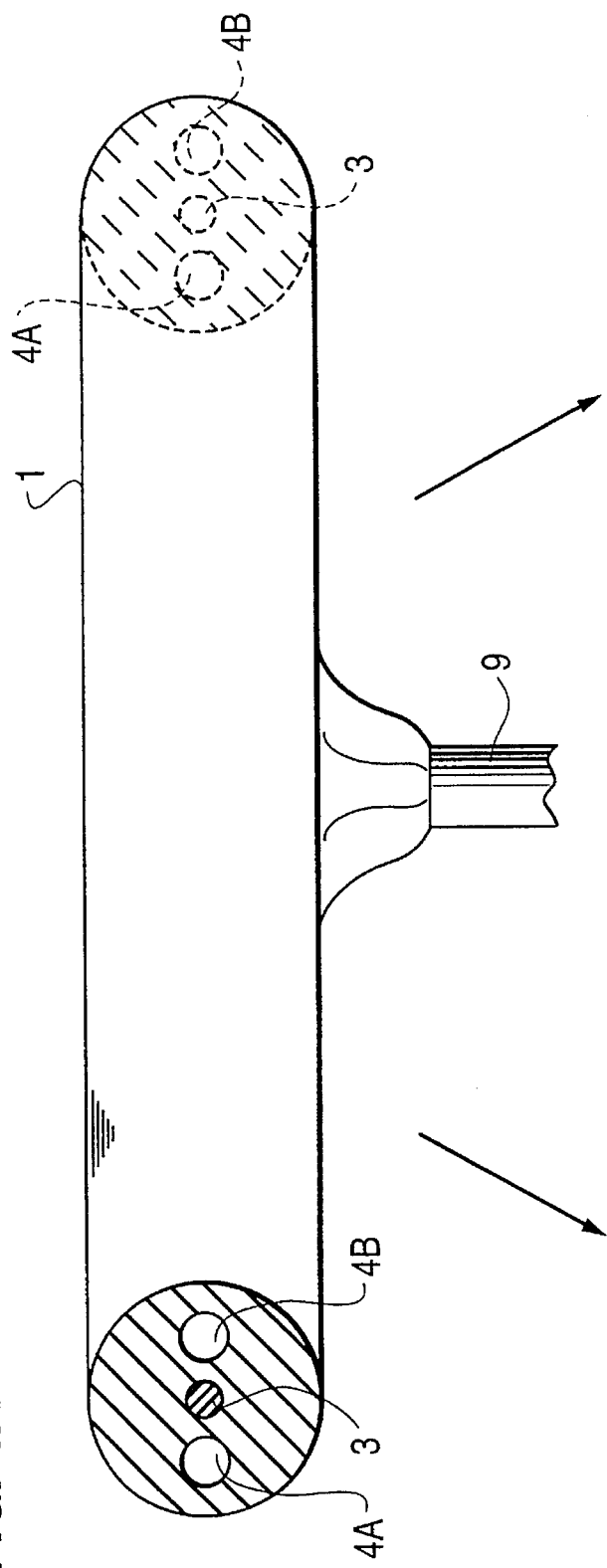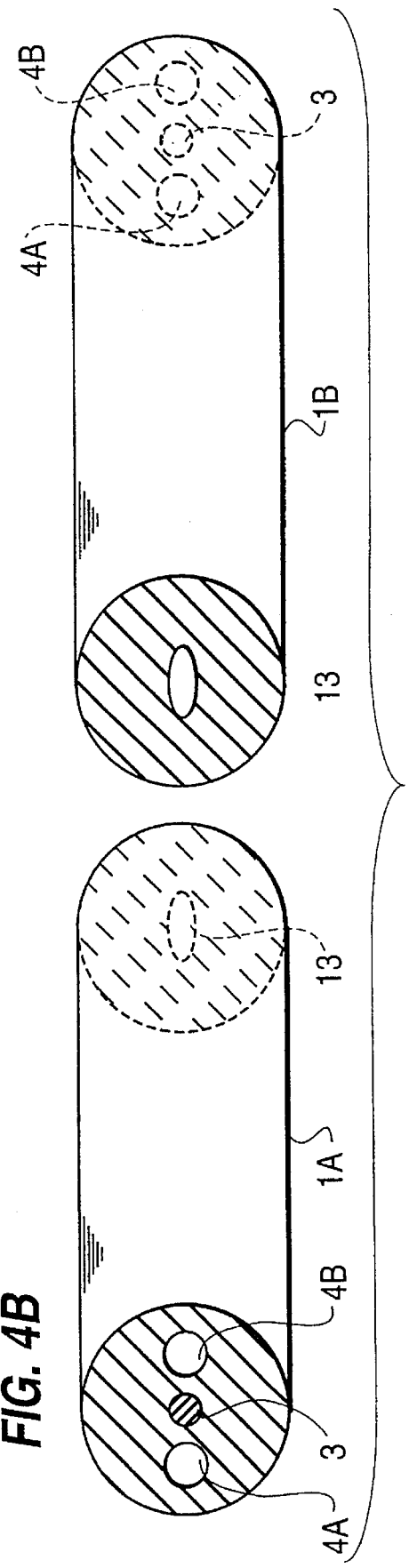
FIG. 4A
FIG. 4B

OPTICAL FIBER AND PROCESS OF PRODUCING THE SAME

BACKGROUND OF THE INVENTION

1. Field of the Invention

The present invention relates to an optical fiber and a process of producing the same, more particularly relates to an optical fiber having a core cross-section shape suited to optical connection with a light source such as a semiconductor laser emitting an elliptical beam and a process of producing the same.

2. Description of the Related Art

In the field of optical measurement using optical fibers or the field of optical communications, various means have been devised to ensure that the beam of light from the light source efficiently strikes the core of the optical fiber.

In the fields of optical communications etc., a semiconductor laser (or a laser diode (LD)) is used as the light source in many cases. Usually, a beam of light with an elliptical cross-section shape is emitted from the end of the LD. In the past, the core of a single mode (SM) optical fiber has been formed with a circular cross-section. To get the incident light beam from the LD directing into an optical fiber with such a core, use has been made of an optical system comprised of special lenses in order to make the elliptical beam of light emitted from the LD a circular beam of light before emitting it into the core of the optical fiber.

Using an optical system to change the beam shape of light in this way, however, necessitates the provision of a complicated optical system, so the price becomes higher and more space is taken up as well. Further, optical loss occurs in the optical system.

Accordingly, attempts have been made to use a mode field converting optical fiber or a spot size converting optical fiber. A mode field converting optical fiber or spot size converting optical fiber has a core of an elliptical cross-section at the light receiving side at its one end and a core of a circular cross-section at the light emitting side at its other end. The elliptical beam of light emitted from the LD is directly fired into the elliptical core at the one end (light receiving side) of the optical fiber and a circular beam of light is emitted from the circular core at the other end (light emitting end) of the optical fiber.

In such a mode field converting optical fiber or spot size converting optical fiber, the elliptical beam of light is changed to a circular beam of light along the longitudinal direction of the optical fiber.

A process for production of a spot size converting optical fiber has been proposed for example, in Japanese Unexamined Patent Publication (Kokai) No. 3-64707.

The process for production of the spot size converting optical fiber will be explained next referring to FIG. 1A to FIG. 1C.

As illustrated in FIG. 1A, an elliptical core-type optical fiber 40 comprised of a core 41 on the outer circumference of which is formed a cladding 42 is prepared. The dimensions of the core 41 at one end are a long axis diameter of 5 μm and a short axis diameter of 2 μm giving a substantially elliptical shape close to that of a rectangle. If heat is applied at the side of this elliptical core type optical fiber, the core 41 having the ellipse cross-section gradually becomes rounded and finally becomes a core 41A having a circle cross-section, between the heated portion and the portion to which the heat-transfer is not substantially subjected or effective, as shown in FIG. 1B. As a result, at the one end, as shown in FIG. 1A, the core is remained at the elliptical core 41, and at the other end, as shown in FIG. 1C, the core becomes the circular core 41A. The diameter of this circular core is 3.6 μm. By applying the heat, the dopant, that is, the germanium (Ge), contained in the core 41 disperses and the spot size becomes 11.2 μm. That is, the process proposed in Japanese Unexamined Patent Publication (Kokai) No. 3-64707 changes the core to a circular shape by heat dispersion of the elliptical core.

This process, however, suffers from the difficulty in changing what is actually close to a rectangular elliptical core to a true circular core. As a result, the problem is encountered of a large transmission loss occurring in the light propagated inside the optical fiber.

Further, even if the elliptical core could be changed to a truly circular core, this method suffers from the disadvantage of a reduction in the difference in the indexes of refraction between the core and the cladding due to the dispersion of the dopant and therefore a reduction in the efficiency of connection.

An example of the conventional process of production of a mode field converting optical fiber will be explained next. An optical fiber having an elliptical core and an optical fiber having a circular core are connected at their ends. If necessary, the connection is heated to cause the dopant at the core portions to disperse and to form a portion along the longitudinal direction which gradually changes in shape from an elliptical core to a circular core. Accordingly, the result is an optical fiber with an elliptical core at one end, a circular core at the other end, and a core portion which gradually changes from an ellipse to a circle along the longitudinal direction of the optical fiber.

This process too, however, encounters the problem of disconnection between the elliptical portion and circular portion of the core and the occurrence of large transmission loss in the light propagated through the inside of the optical fiber.

Further, even if the elliptical core can be changed to a truly circular core, there is the problem of a reduction in the difference in the indexes of refraction between the core and the cladding due to the dispersion of the dopant and therefore a reduction in the efficiency of connection.

As explained above, both the process for production of the mode field converting optical fiber and the process for production of the spot size converting optical fiber suffer from the problem of a large transmission loss in the optical fiber produced. Further, they have the problem of a reduction in the difference in the indexes of refraction between the cores and claddings.

SUMMARY OF THE INVENTION

An object of the present invention is to provide a process of producing an optical fiber having little transmission loss, reduction in the indexes of refraction and an elliptical cross-section core at a portion (a first portion) and a complete-circular cross-sectional core at another portion (a second portion) spaced a predetermined distance to the first portion.

Another object of the present invention is to provide an optical fiber having little transmission loss, reduction in the indexes of refraction and a complete-circular cross-sectional core at a portion (a first portion) and an elliptical cross-sectional core at another portion (a second portion) spaced a predetermined distance to the first portion.

According to the present invention, there is provided a process of producing an optical fiber comprising a core, the cross-sectional shapes thereof at a portion and another portion being different, the process including the steps of heating a first optical fiber at the side thereof, the first optical fiber having a core having a substantially uniform cross-sectional area in the longitudinal direction and a cladding formed with at least one through-hole along the longitudinal direction of the core, to continuously change the shape of the through-hole along the longitudinal direction, from the heating portion to the portion where the heat-transfer is not substantially subjected so that the cross-sectional shape of the core is continuously changed along the longitudinal direction from the heating portion to the portion where the heat-transfer is not substantially subjected.

Preferably, in the heat step, the pressure in the through-hole is reduced.

Preferably, the first optical fiber has two through-holes having substantially uniform cross-sectional areas and formed in parallel at the two sides of the core.

Specifically, the initial cross-sectional shape of the core of the first optical fiber before the heating processing is a circle, and, after the heating processing the cross-sectional shape of the core at one end is left as a circle, and the cross-sectional shape of the through-hole is reduced along the direction toward the other end by heat treatment so that the cross-sectional shape of the core at the other end becomes an ellipse.

Or, specifically, the cross-sectional shape of the core of the first optical fiber before the heating processing is an ellipse, and, after the heating processing the cross-sectional shape of the core at tone end is left as an ellipse, and the cross-sectional shape of the through-hole is reduced along the direction toward the other end by heat treatment so that the cross-sectional shape of the core at the other end becomes a circle.

Preferably, sealing treatment is applied to seal the reduced or crushed through-hole of the optical fiber at the one end.

The sealing treatment may comprise connecting a second optical fiber having a cladding portion facing the through-hole of the formed optical fiber for sealing the through-hole and a core of a cross-sectional shape the same as the core of the formed optical fiber.

The sealing treatment may also comprise connecting a second optical fiber having the structure substantially equal to that of the first optical fiber and formed by the same material to face the both ends of the cores and do not face the both through-holes.

The sealing treatment may comprise filling the through hole of the produced optical fiber with a sealing material.

Further preferably, second sealing treatment is further applied to seal the portion of the reduced or crushed through-hole at the other end.

The second sealing treatment may comprise connecting to the other end a third optical fiber having a cladding portion at the other end and a core of a cross-sectional shape the same as the core of the produced optical fiber.

The sealing treatment may comprise connecting a third optical fiber having the structure substantially equal to that of the first optical fiber at the other end and formed by the same material to face the both ends of the cores and do not face the both through-holes.

Preferably, the core portion at the one end with the circular cross-sectional shape has connected to it a third optical fiber having a core of the same diameter and same material as the core of the formed optical fiber and a cladding of the same material.

Or, preferably, the core portion at the one end with the elliptical cross-sectional shape has connected to it a third optical fiber having a core of the same cross-sectional shape and same material as the core of the formed optical fiber and a cladding of the same material.

According to the present invention, there is also provided an optical fiber produced by heating a first optical fiber comprising a core having a substantially uniform cross-sectional area in the longitudinal direction and a cladding formed with at least one through-hole along the longitudinal direction of the core while heating the first optical fiber along the longitudinal direction and a cladding formed with at least one through-hole along the longitudinal direction of the core while heating the first optical fiber along the longitudinal direction thereof so as to continuously change the cross-sectional shape of the through-hole, and continuously change the cross-sectional shape of the core along the longitudinal direction, and to thereby produce an optical fiber comprising a core having the continuously changing cross-sectional area along the longitudinal direction.

According to the present invention, there is further provided a process of producing an optical fiber comprising a core, the cross-sectional shapes thereof at the portion and another portion being different, the process including the steps of: forming an optical fiber preform, having a first portion to form a core of the optical fiber and a second portion which to form a cladding having at least one through-hole formed along the first portion to form the core, so that the minimum distance between the outer circumference of the through-hole and the outer circumference of the optical fiber preform becomes at least a predetermined magnitude; applying gas to give pressure to the through-hole in the optical fiber preform; and drawing the optical fiber preform at a temperature of a predetermined range of a drawing temperature.

Preferably, the minimum distance is at least 10 percent of a diameter of the optical fiber preform.

Preferably, the drawing temperature is set to a certain temperature between 1800° C. and 2000° C.

Preferably, the gas pressure applied to the through-hole is made high when making the cross-sectional shape of the core circular and is made lower when making the cross-sectional shape of the core elliptical.

Preferably, the cross-sectional shape of the core at one end is made circular, the cross-sectional shape of the core at the other end is made elliptical, and an intermediate portion is formed so that the core portion of the elliptical shape at the other end are continuously connected.

According to the present invention, there is provided an optical fiber comprising a core, the cross-sectional shapes thereof at a portion and another portion being different, produced by forming an optical fiber preform, having a first portion to form a core of the optical fiber and a second portion which to form a cladding having at least one through-hole formed along the first portion to form the core, so that the minimum distance between the outer circumference of the through-hole and the outer circumference of the optical fiber preform becomes at least a predetermined magnitude, applying gas pressure to the through-hole in the optical fiber preform, and drawing the optical fiber preform at a temperature of a predetermined range of a drawing temperature.

BRIEF DESCRIPTION OF THE DRAWINGS

These and other objects and features of the present invention will become clearer from the following description given in relation to the attached drawings, in which:

FIG. 4A and FIG. 4B are views illustrating the change in the cross-sectional shape of the core by heating the circular core optical fiber of the first embodiment of the present invention;

DESCRIPTION OF THE PREFERRED EMBODIMENTS

Preferred embodiments of the optical fiber of the present invention and process of production of the same will be explained below.

First Embodiment

A mode field converting optical fiber will be explained first as a first embodiment of the optical fiber of the present invention.

Figure 1:
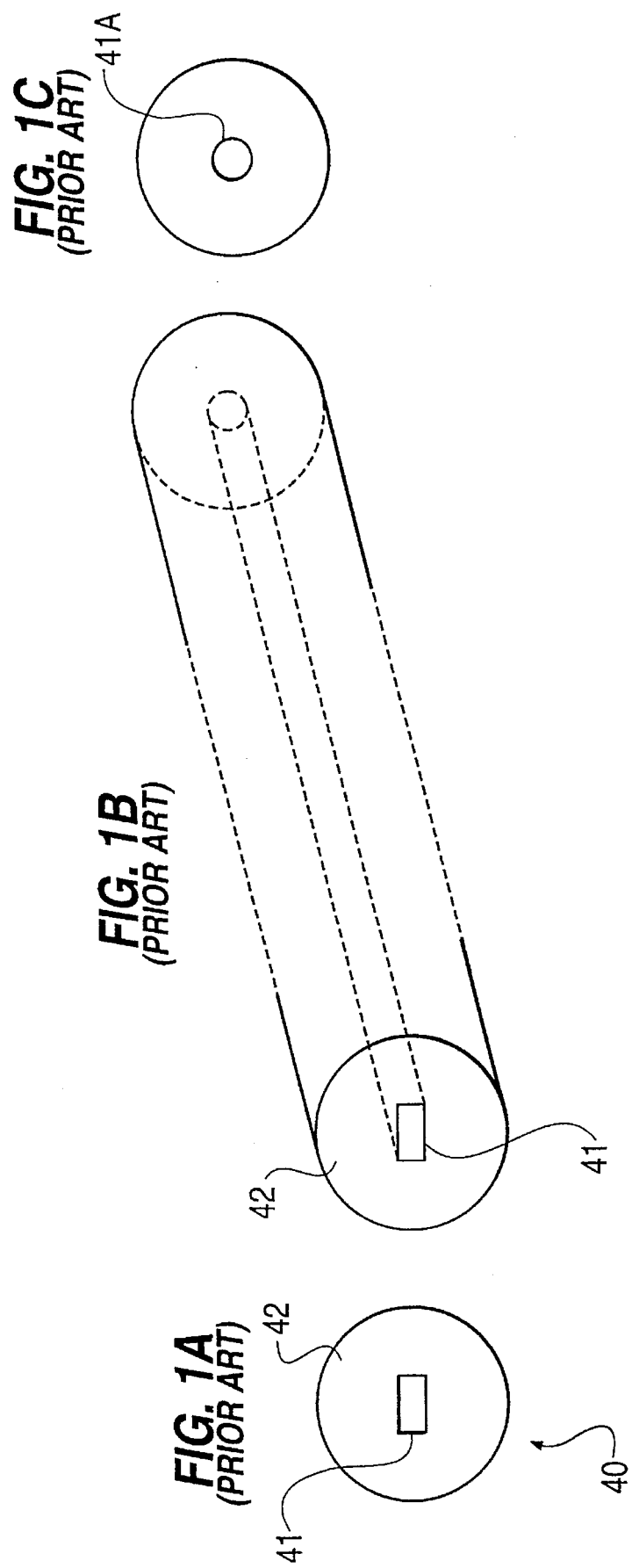
FIG. 1A to FIG. 1C are views showing a conventional process for producing a spot size converting optical fiber.
Figure 2:
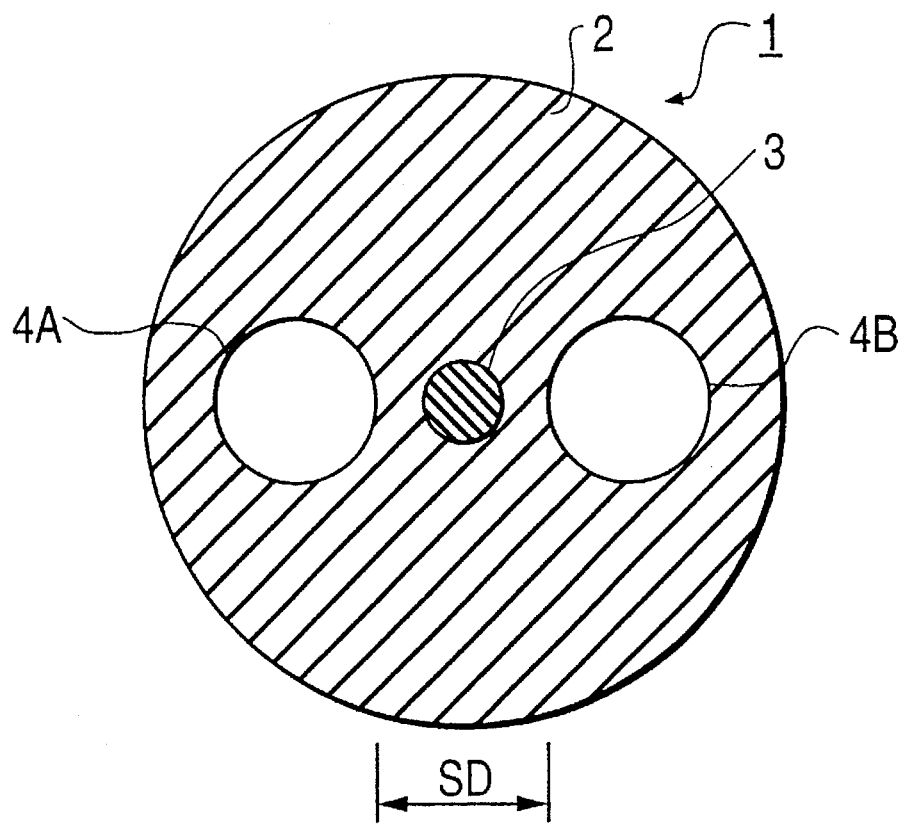
FIG. 2 is a cross-sectional view of a circular core optical fiber of a first embodiment of the present invention.

FIG. 2 is a cross-sectional view of a circular core optical fiber 1 before producing the mode field converting optical fiber of the first embodiment of the optical fiber of the present invention. The optical fiber is provided with sideholes (threading holes) having substantially identical cross-sections in the longitudinal direction.

This circular core optical fiber 1 has a circular core 3 and a cladding 2 provided around its outer circumference. Inside the cladding 2 at the two sides of the circular core 3 along the longitudinal direction of the circular core 3 are formed two side holes (through holes) 4A and 4B aligned in parallel at the two sides of the circular core 3. The side holes 4A and 4B have cross-sections substantially even in the longitudinal direction of the optical fiber 1. That is, the circular core optical fiber 1 illustrated in FIG. 2 is an optical fiber with the side holes 4A and 4B.

In this embodiment, the diameter of the cladding 2 is 125 µm, the diameter of the circular core 3 is 8.1 µm, the diameters of the side holes 4A and 4B are 18.9 µm each, and the distance SD between the two side holes 4A and 4B is 38.4 µm.

The material of the cladding 2 is pure silica glass. The material of the circular core 3 is silica glass containing germanium oxide as a dopant.

The circular core 3 is produced by the VAD method. The difference in the indexes of refraction of the cladding 2 and the circular core 3 is 0.35 percent.

The production of the circular core optical fiber 1 having these side holes will be explained next.

As one process for production of an optical fiber with side holes, there is known the one proposed in Japanese Unexamined Patent Publication (Kokai) No. 59-35034 for example.

The circular core optical fiber 1 is produced by drawing an optical fiber preform (preform) in the same way as in the production of an ordinary optical fiber. The optical fiber preform resembles the circular core optical fiber.

The optical fiber preform has a portion to form the circular core 3 of the circular core optical fiber and a portion to form the cladding 2 having a portion to form the side holes 4A and 4B of the circular core optical fiber 1. The portion to form the side holes 4A and 4B is formed for example by drilling the through holes after producing the original optical fiber preform comprised of the portion to form the circular core 3 and the portion to form the cladding 2, and without holes.

The circular core optical fiber 1 is produced by drawing the optical fiber preform in a heated state while applying gas pressure to the portions to form the side holes 4A and 4B of the optical fiber preform.

The process for producing a circular core optical fiber 1 from the above optical fiber preform is substantially the same as the ordinary process for drawing an optical fiber from an ordinary optical fiber preform without side holes except for the machining of the portions to form the side holes 4A and 4B.

The conditions for pressurizing the portions to form the side holes 4A and 4B are determined in consideration of the drawing temperature, drawing speed, diameter of the optical fiber preform, etc. These pressurizing conditions may be determined by preliminary experiments, but in this embodiment the pressure to the portions to form the side holes 4A and 4B was about 50 mmHg.

Note that an improvement of the process of production of an optical fiber having such side holes will be explained later as the fifth embodiment.

Figure 3:
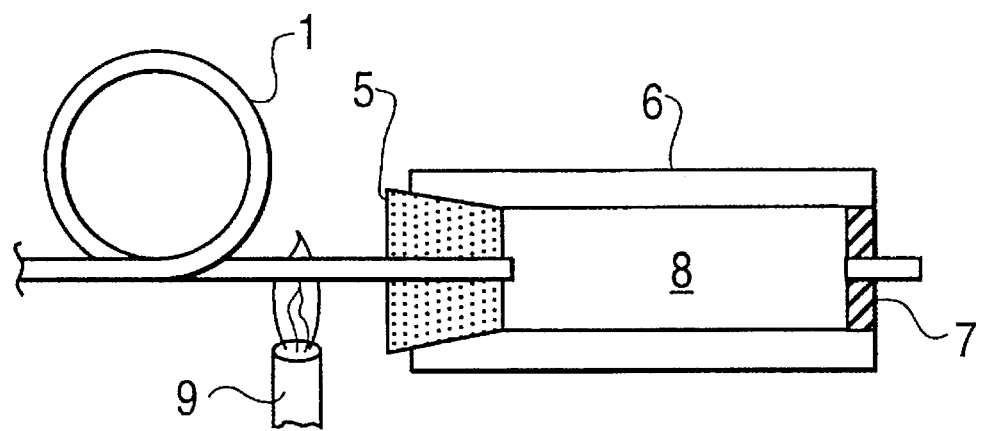
FIG. 3 is a view of the configuration of a device for producing the circular core optical fiber shown in FIG. 2.

FIG. 3 shows the schematic configuration of an apparatus for producing the mode field converting optical fiber from the circular core optical fiber 1 produced in this way. This apparatus has a rubber hose 6, a rubber stopper 5, and a connector 7 connected to a not shown vacuum pump and not shown pressure reducing device. The hollow portion 8 is reduced in pressurize by the vacuum pump and the pressure reducing device.

The end of the circular core optical fiber 1 is inserted in the rubber stopper 5, and the side holes 4A and 4B are reduced in pressure through the hollow portion 8 of the rubber hose 6. The two ends of the portion where the circular core 3 of the circular core optical fiber 1 is to be made elliptical are held while reducing the pressure of the side holes 4A and 4B and the center portion of the circular core 3 between them is heated from the sides by a propane oxidizing flame of a microtorch 9 with a 3 mm burner diameter.

The degree of the reduction of pressure of the hollow portion 8 is preferably larger than −20 mmHg. Further, the circular core optical fiber 1 is preferably in an undrawn state at the time of heat treatment. The reason is that if drawn, the diameter of the circular core 1 becomes smaller and therefore the mechanical strength of the circular core optical fiber 1 falls.

The first embodiment to third experiments of the present invention will be explained in detail below.

First Experiment

The circular core optical fiber 1 used here is one with a diameter of the cladding 2 of 125 μm, a diameter of the circular core 3 of 8.1 μm, diameters of the side holes 4A and 4B of 18.9 μm each, and a center distance SD between the two side holes 4A and 4B of 38.4 μm.

The material of the cladding 2 is pure silica glass, while the material of the circular core 3 is silica glass including germanium oxide as a dopant.

The circular core 3 was made by the VAD method. The difference in indexes of refraction between the cladding 2 and the circular core 3 was 0.35 percent.

As illustrated in FIG. 3 and FIG. 4A, a microtorch 9 of a burner diameter of 3 mm was used to heat for one minute the circular core optical fiber 1 over a certain width at a heating temperature of 1800° to 2000° C. The heating was stopped after the elapse of the one minute from the start of the heating. As shown in FIG. 4B, the circular core optical fiber 1 is cut at the center of the heated portion to obtain two optical fibers 1A and 1B. The cut faces of the two optical fibers 1A and 1B, that is, the cross-section of the heated portion, were examined and as a result side holes 4A and 4B were substantially crushed and the circular hole 3 was deformed to an elliptically shaped core 13. Note, the unheated portions, i.e., portions (second portions) spaced to the heated portion (a first portion) and substantially not subjected to the heat transfer, for example, the two end faces of the optical fibers 1A and 1B, had the circular cores 3 and the side holes 4A and 4B maintained intact.

From this, it is learned that heating by the microtorch 9 enables of the heated portion of the circular core optical fiber 1 and the side holes 4A and 4B adjacent to the heated portion to be crushed and the circular core 3 to be made elliptical. In other words, by heating the circular core optical fiber 1 with the side holes 4A and 4B, from the side thereof it is possible to modify it to an optical fiber with an elliptical core 13.

Second Experiment

Figure 5:
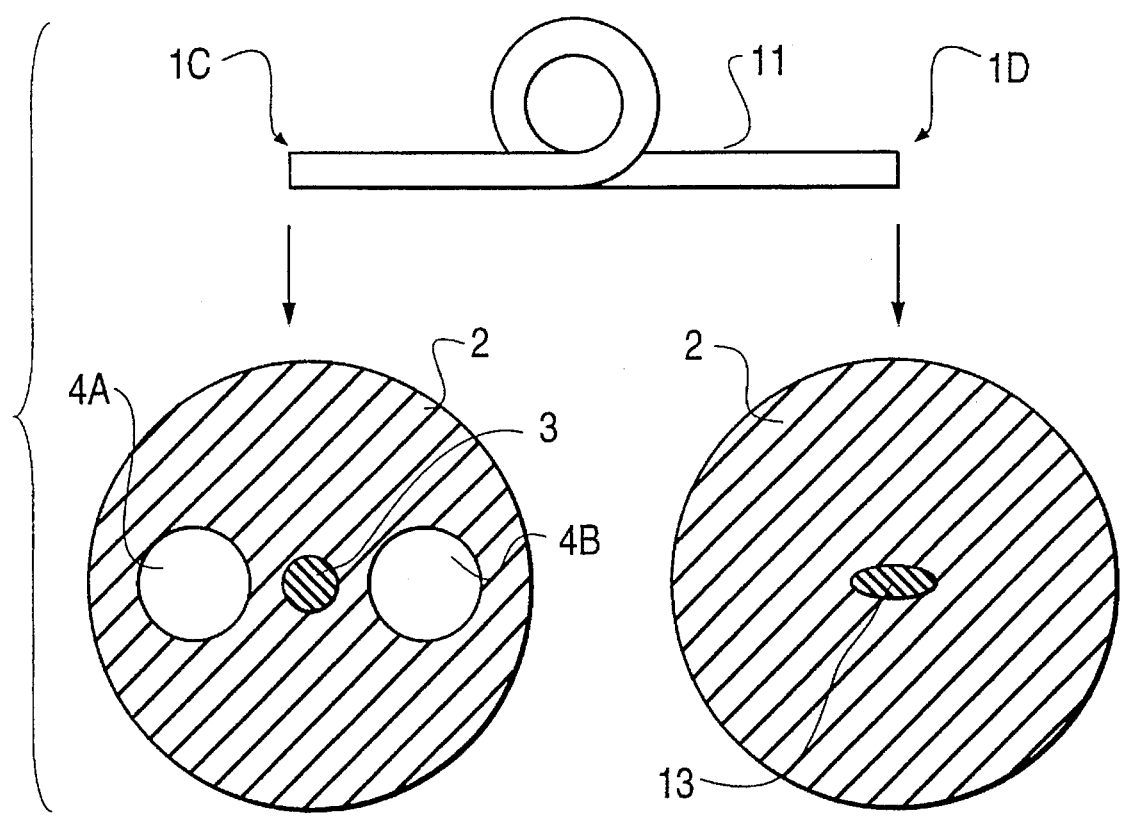
FIG. 5 is a view illustrating a mode field converting optical fiber produced in the first embodiment of the present invention.

The first experiment involved just heating part of the circular core optical fiber 1 by the microtorch 9, but the second experiment affixes the microtorch 9 and has the circular core optical fiber 1 passed over the flame of the microtorch 9 continuously, or, vice versa. Namely, the microtorch 9 and the optical fiber 1 are moved relatively each other along the longitudinal direction of the optical fiber 1. As a result, the mode field converting optical fiber 11 illustrated in FIG. 5 was produced. This mode field converting optical fiber 11 is an optical fiber with one end remaining as the original circular core optical fiber 1 comprised of the circular core 3 and the cladding 2 having the side holes 4A and 4B and with the other end having the side holes 4A and 4B crushed by the heating the circular core 3 changed to an elliptical core 13.

The mode field converting optical fiber 11 changes continuously in the cross-sectional shape of the core from a circular core 3 to an elliptical core 13 from the end 1C where the state of the original circular core optical fiber 1 is maintained intact to the other end 1D where the elliptical core 13 is formed. That is, it is formed as a mode field converting optical fiber.

The mode field converting optical fiber 11 is an optical fiber with an outer diameter of 120 μm. The dimensions of the elliptical core 13 were a long diameter of 13.4 mm and a short diameter of 4.7 μm.

In the above experiment, the side holes 4A and 4B of the elliptical core 13 side were completed crushed by the heat treatment, but if the heating time of the microtorch 9 is shortened, the side holes 4A and 4B can be left remaining as well.

Further, the degree of the shrinkage of the side holes 4A and 4B and the degree to which the circular core 3 forms an ellipse are correlated with each other. If the degree of shrinkage due of the side holes 4A and 4B due to heating is reduced, the degree of the ellipse formed by the circular core 3 is also reduced.

Third Experiment

The first experiment and the second experiment showed examples where the side holes 4A and 4B were reduced in pressure and the side holes 4A and 4B at the other end are crushed. The third experiment shows an example where the side holes 4A and 4B are not reduced in pressure and the side holes 4A and 4B at the other end are not completely crushed.

A circular core optical fiber 1 of the same shape as used in the first experiment was heated for 10 seconds over a certain width, without reduction of pressure, by the microtorch 9 at a heating temperature of 1800° to 2000° C. After the 10 seconds of heating, the circular core optical fiber 1 was cut at the heated portion and the surfaces of the two resultant optical fibers were examined.

As a result, the optical fiber had a circular core 3 at one end to which the heat-transfer was not substantially subjected, i.e., a second portion, and an elliptical core 13 at the other end which was heated, i.e., a first portion. That is, the end of the optical fiber 1A at the heated portion had shrunken side holes 4A and 4B, but the the outer shape of the optical fiber remained uncrushed. Note, the uncrush of the outer shape of the optical fiber maintains the facility of the connection to another optical fiber. The diameter of the cladding 3 was 123 μm, the diameter of the side holes 4A and 4B was 22.7 μm, and the distance between the side holes 4A and 4B was 29.1 μm. The circular shaped core become an elliptical shape of a long diameter of 10.6 μm and a short diameter of 5.5 μm.

As explained above, depending on whether or not the pressure of the side holes 4A and 4B is reduced and the conditions by which the circular core optical fiber 1 are heated by the microtorch 9 etc., it is possible to change the shape of the circular core 3 and the side holes 4A and 4B of the circular core optical fiber 1 in various manners.

From this, it is learned that according to the first embodiment of the present invention, by suitably setting the heating conditions and the pressure reduction conditions, it is possible to produce a mode field converting optical fiber having the desired properties and a core of the desired cross-sectional shape.

Modifications of First Embodiment

The material of the core is not limited to that explained above. The material of the core is suitably silica glass containing germanium oxide, but use may also be made of silica glass containing an ordinary core component such as phosphorus oxide, titanium oxide, and aluminum oxide.

The material of the cladding is also not limited to that explained above. The material of the cladding is suitably pure silica glass, but use may also be made of silica glass containing fluorine or boron oxide. Of course, a predetermined difference in indexes of refraction is maintained between the core and the cladding.

The diameters of the side holes 4A and 4B, the distance between the two side holes 4A and 4B, and the distance between the side holes 4A and 4B and the circular core 3 are not limited to the ones illustrated above, but may be freely set. These conditions, however, are determined in consideration of the degree by which the circular core is to be made elliptical in the heat treatment.

The means for heating is not limited to the above microtorch 9. Use may be made of a heating means such as a small sized electric furnace as well.

The device shown in FIG. 3 is just an example as well and the invention is not limited to it. Any device which enables reduction in pressure of the side holes 4A and 4B in accordance with the above conditions may be used.

Note that the optical fiber of the first embodiment of the present invention was an optical fiber comprised of a circular core, a cladding containing that core, and side holes 4A and 4B formed in the longitudinal direction of the cladding so as to be positioned facing each other in the diametrical direction at the two sides of the circular core, but an optical fiber preform resembling this optical fiber but of larger dimensions can be produced by known drawing methods, so production is not particularly difficult.

In the above embodiment, illustration was made of a circular core optical fiber 1 with two side holes 4A and 4B, but when working the present invention it is not necessary to provide two side holes. For example, it is also possible to heat an optical fiber with one side hole and, when necessary, reduce the pressure of the side hole so as to change the cross-sectional shape of the core.

Of course, it is also possible to provide three or more side holes.

As explained above, according to the first embodiment of the present invention, by heating part of a circular core optical fiber 1 having a circular core, a cladding encompassing the same, and, preferably, two side holes 4A and 4B at the two sides of the circular core so as to change the core to an ellipse, the circular core continuously becomes elliptical and a mode field converting optical fiber can be formed with a circular core at one end the second portion to which is not substantially subjected the heat-transfer, and an elliptical core at the other end the first portion which is heated.

Further, this mode field converting optical fiber has little transmission loss.

Further, if heating while reducing the pressure of the side holes 4A and 4B, the side holes 4A and 4B quickly are crushed at a low heating temperature, so the change of the circular core to an ellipse is promoted more, the heat dispersion of the dopant is little, and there is less of a reduction in the difference in indexes of refraction between the core and the cladding.

The mode field converting optical fiber of the first embodiment of the present invention may be suitably used for optical communications or optical measurement etc. as a polarization-preserving optical fiber or sensor use optical fiber.

Second Embodiment

An explanation will now be made of a mode field converting optical fiber as a second embodiment of the present invention.

In the mode field converting optical fiber of the first embodiment, the side holes 4A and 4B were remained partially uncrushed or the side holes 4A and 4B were somewhat crushed. There is a chance of light-absorbing gas or liquid entering these side holes 4A and 4B and thereby causing a larger transmission loss of the optical fiber.

Depending on the type of the gas or liquid invading the side holes 4A and 4B, there is a chance of the mechanical properties of the optical fiber changing.

The second embodiment improves on this weakness of the mode field converting optical fiber of the first embodiment explained above.

Figure 6:
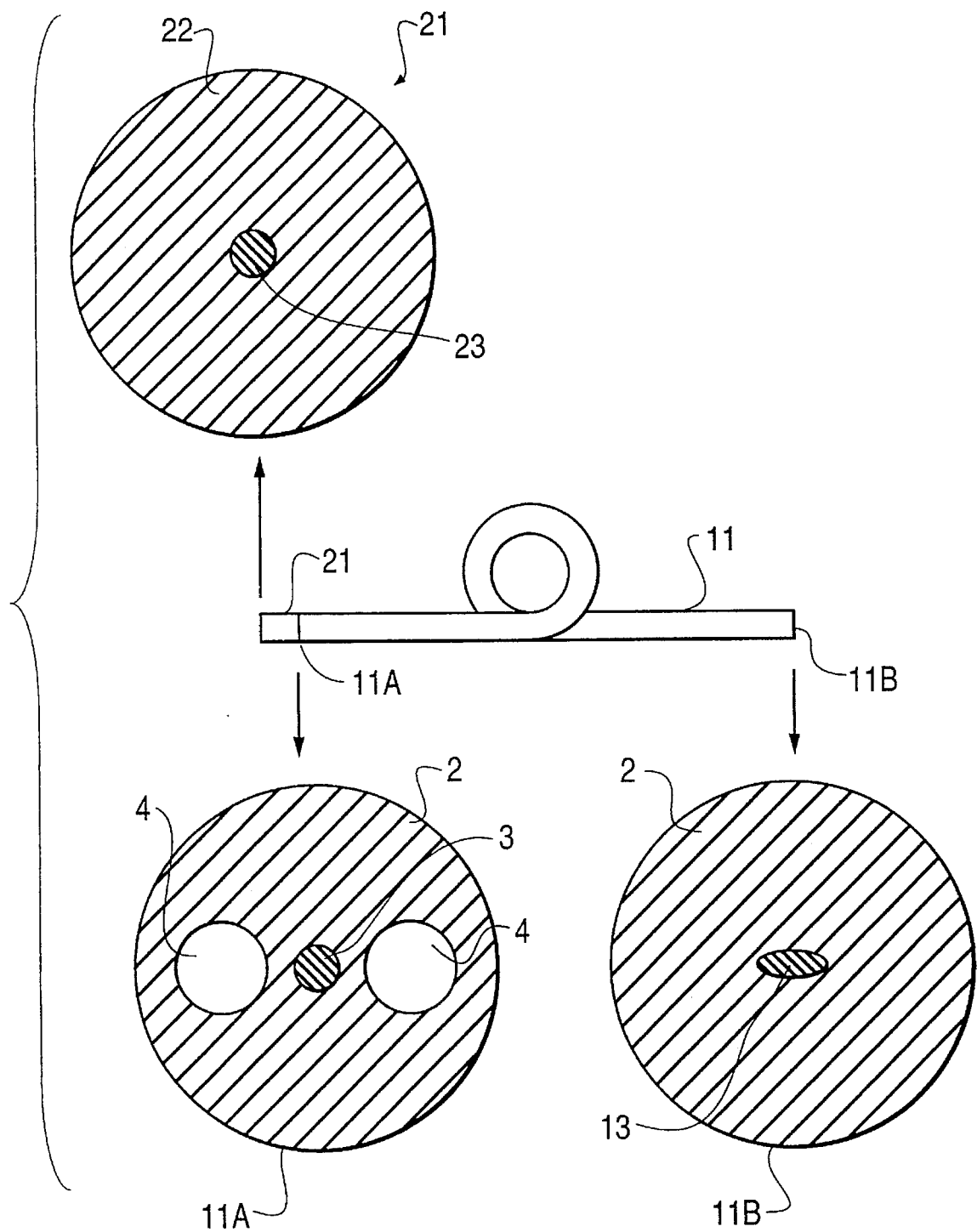
FIG. 6 is a view illustrating a mode field converting optical fiber produced in the second embodiment of the present invention.

FIG. 6 is a view of the mode field converting optical fiber according to the second embodiment of the present invention. In this mode field converting optical fiber, a short optical fiber 21 having a circular core 23 of the same diameter and material as the circular core 3 and a cladding 22 of the same diameter and material as the cladding 2 is connected to the end of the circular core optical fiber 1 side of the mode field converting optical fiber shown in FIG. 5 where the side holes 4A and 4B remain so that the circular core 3 and the circular core 23 match and thereby seal the side holes 4A and 4B from the outside air.

Next, an explanation will be made of the connection of the end of the circular core optical fiber 1 and the optical fiber 22.

The connection is preferably by melt-fusion due to its high sealing property. For the melt-fusion work, use may be made of a commercially available optical fiber melt-fusion connection machine. In the melt-fusion, if the fusion temperature is high, the end faces of the optical fibers will melt more than necessary and the possibility will occur of the side holes 4A and 4B being crushed and the core portion deforming. Accordingly, it is preferable to perform the melt-fusion at as low a temperature as possible enabling melting of the glass.

Further, it is possible to connect the connection portions by an adhesive instead of the melt-fusion.

Further, the method of sealing the side holes 4A and 4B is not limited to the connection of the mode field converting optical fiber 11 and a short optical fiber 21 by melt-fusion or an adhesive. It is also possible to use a sheet or block of transparent plastic to cover the block the side holes 4A and 4B and hold it down with the optical fiber 21 by an adhesive or mechanically.

Further, in addition to the above methods of sealing, it is possible to fill glass or a transparent dense organic substance in the side holes 4A and 4B to seal the side holes 4A and 4B. When filling them with glass, it is possible to fill a low melting temperature glass in a molten state in the side holes 4A and 4B and then cool and harden it. Alternatively, it is possible to fill the side holes 4A and 4B with a sol-sol material and cause a reaction to harden it. When filling an organic substance in the side holes 4A and 4B, a plastic which has been heated to melt is filled in the side holes 4A and 4B and then cooled to solidify. Further, it is possible to fill the side holes 4A and 4B with a thermosetting resin or light curing resin and then cause hardening by heat or light to seal the side holes 4A and 4B.

Accordingly, the side holes 4A and 4B can be sealed by various methods in addition to the above-mentioned melting and connection of the ends.

By sealing the side holes 4A and 4B by the method of connecting the optical fiber 21 to the end of the circular core optical fiber etc., entry of light absorbing gas or liquid into the side holes 4A and 4B are prevented, so there is no change in the transmission loss of the optical fiber. Further, it is possible to prevent a change in the mechanical properties of the optical fiber 11.

Modification of Second Embodiment

Figure 7:
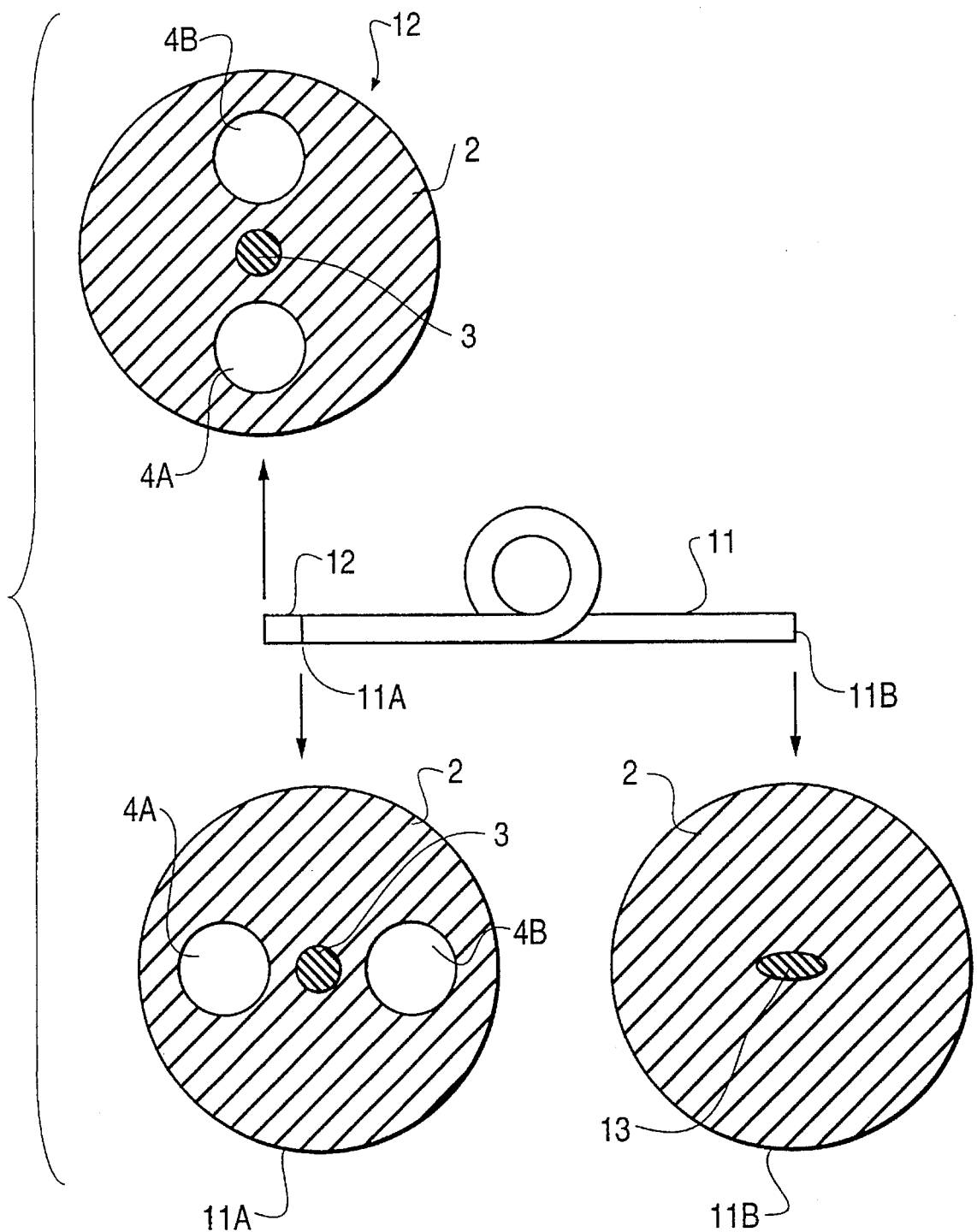
FIG. 7 is a view illustrating a mode field converting optical fiber shown in FIG. 6.

FIG. 7 shows a modification of the mode field converting optical fiber shown in FIG. 6.

In the mode field converting optical fiber shown in FIG. 7, a short circular core optical fiber 13 having the circular core 3, the side holes 4a, and 4B, and the cladding 2 is connected to the end 11A of the optical fiber 11 with the side holes 4A and 4B remaining so that the circular cores match. However, the circular core optical fiber 12 is connected to the end 11a of the mode field converting optical fiber 11 so that the side holes 4A and 4B are not matched with each other, but, in the illustrated example, the pairs of the side holes 4A and 4B are offset from each other so that the side holes 4A and 4B of the end 11A side of the mode field converting optical fiber are sealed.

Details of the connection and modifications of the same can be understood from the explanations of the various techniques used made in the second embodiment.

In this modification as well, the side holes 4A and 4B of the end 11A side of the mode field converting optical fiber are sealed. Accordingly, in this embodiment as well, the same effects can be exhibited as in the second embodiment.

Note that in this modification, it is possible to use the circular core optical fiber 12 before the formation of the mode field converting optical fiber 11, so the effect is exhibited that there is no need for preparation of a special optical fiber for sealing the ends.

Figure 8:
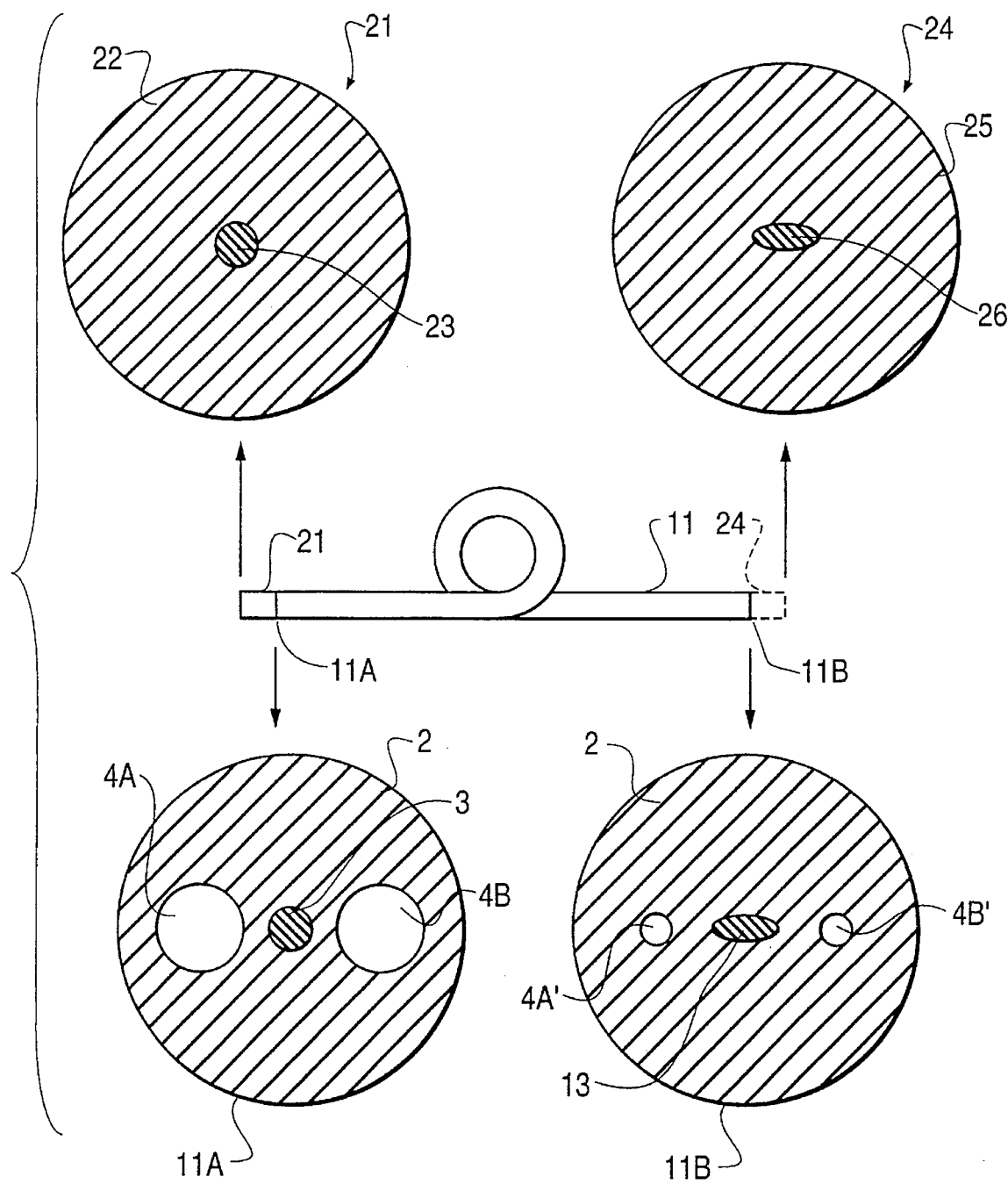
FIG. 8 is a view illustrating a mode field converting optical fiber produced in the third embodiment of the present invention.

FIG. 8 illustrates a mode field converting optical fiber of a third embodiment as a modification of the second embodiment. The mode field converting optical fiber 11 illustrated in FIG. 8 is provided with the optical fiber 21 illustrated in FIG. 5 (or is provided with the circular core optical fiber 12 illustrated in FIG. 7) and, further, has at the ellipse-forming end 11B of the mode field converting optical fiber 11 shown in FIG. 5 as well a short optical fiber, having an elliptical core 26 of the same cross section as the cross section of the elliptical core 13 and of the same material and a cladding 25 of the same diameter and material as the cladding 2, connected to the end 11B of the mode field converting optical fiber 11 so that the cross sections of the elliptical core 13 and the elliptical core 26 match.

Details of the connection and modifications of the same can be understood from the explanations of the various techniques used made in the second embodiment.

The end 11B formed with the elliptical core 13 should have no remaining side holes 4A and 4B, but sometimes holes remain as shrinkaged holes 4A' and 4B' which are large enough for the entry of gas etc. Further, as explained in the first embodiment, sometimes the shrinkaged holes 4A' and 4B' remain without being completed crushed.

Accordingly, by connecting the optical fiber 24 to the end 11B side, the shrinkaged holes 4A' and 4B' at the end 11B side are also sealed, so entry of light-absorbing gas or liquid from of the holes 4A' and 4B' and can be prevented and the transmission loss of the optical fiber can be kept from changing. Further, it is possible to prevent changes in the mechanical properties of the mode field converting optical fiber 11.

Instead of the above optical fiber 24, it is also possible to connect an optical fiber having a circular core of the diameter same as the long diameter of the ellipse-forming core 13 of the end 11B of the mode field converting optical fiber 11, to the end 11B of the mode field converting optical fiber 11 so that the ellipse-forming core 13 and the corresponding circle-forming core match.

Details of the connection and modifications of the same can be understood from the explanations of the various techniques used made in the second embodiment.

In addition to the effects of the mode field converting optical fiber described in the second embodiment, since the end of the elliptical core 13 side is sealed, there is no change in the transmission loss of the mode field converting optical fiber and it is possible to prevent changes in the mechanical properties.

Fourth Embodiment

Figure 9:
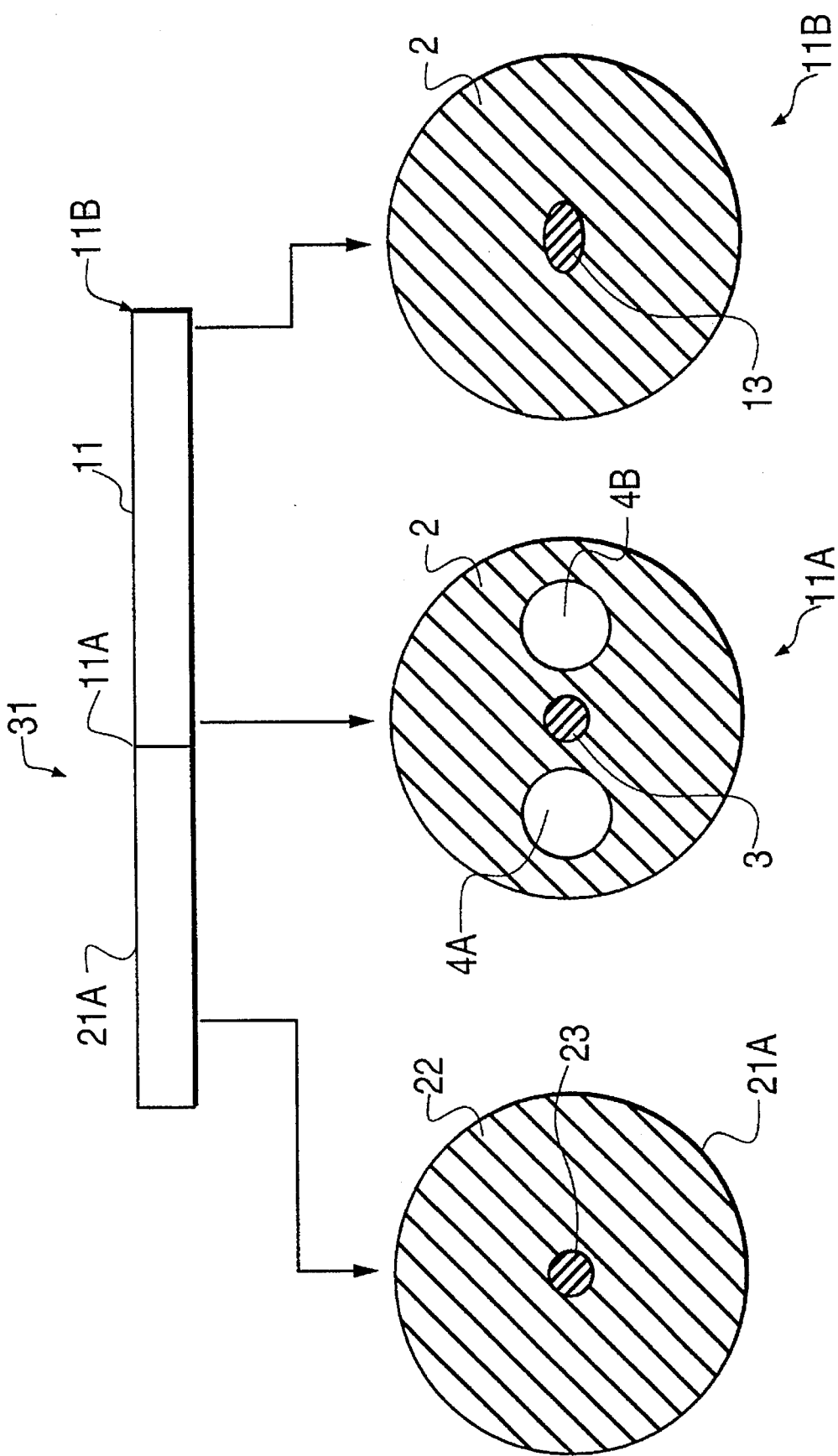
FIG. 9 is a view illustrating a mode field converting optical fiber produced in the fourth embodiment of the present invention.

FIG. 9 is a view of the mode field converting optical fiber of a fourth embodiment.

The mode field converting optical fiber of the fourth embodiment is comprised of the circular core optical fiber 21 connected to a mode field converting optical fiber being connected to the end 11A instead of the long optical fiber 21A.

The connection of the end of the elliptical core side of the mode field converting optical fiber 11 and the end of the optical fiber 21A is similar to that in the second embodiment.

The mode field converting optical fiber of the fourth embodiment has the advantage, compared with the mode field converting optical fiber illustrated in FIG. 6 to FIG. 8, of being able to be used for optical communications or optical measurement etc. with the connected optical fiber 21A as it is.

The basic effect of the sealing of the side holes 4A and 4B by the optical fiber 21A is similar to that of the second embodiment and the third embodiment.

Fifth Embodiment

An explanation will next be made of a fifth embodiment relating to the production of an optical fiber having side holes at the two sides of the core from an optical fiber preform.

An optical fiber itself provided with side holes at the two sides of its core has been introduced as a side hole optical fiber for preserving polarization (Electronics Letters, vol. 18, pp. 824 to 826, 1981), pressure sensor optical fiber (Optics Letters, vol. 11, pp. 333 to 335, 1986), EO effect optical fiber (OFC' 95 Abstracts, PD-6, 1995), etc.

As a process for the production of an optical fiber with side holes, there is known the one proposed in Japanese Unexamined Patent Publication (Kokai) No. 59-35034. This process, as explained above, is a process for heating and drawing an optical fiber preform having side holes formed at the two sides of the core portion and similar in shape to the optical fiber but having larger dimensions, while controlling the gas pressure in the side holes.

This publication, however, describes that if heating and drawing the optical fiber preform while applying gas pressure to the preform, projections or grooves will occur in the outer circumference of the optical fiber. The existence of projections or grooves in the outer circumference of the optical fiber means the possibility of a reduction in the mechanical strength of the optical fiber and also difficulties in connecting with other optical fibers.

The above patent publication described the outer circumferential shape of the optical fiber, but made no mention of the changes in shape of the core of the optical fiber. Therefore, the inventors of the present patent application set their sights on an optical fiber suited for the mode field converting optical fiber of the present invention and drew optical fiber preforms having side holes at the two sides of the core while applying gas pressure to the side holes. As a result, they discovered that no changes occur in the outer circumferential shape of the optical fiber which is drawn, but the shape of the core of the optical fiber changes in various ways. The fifth embodiment of the present invention is based on this discovery and relates to the production of an optical fiber suited for a mode field converting optical fiber.

Details will be given below.

First Experiment

A first experiment of the fifth embodiment will be explained next.

A single mode optical fiber preform of quartz glass made by the usual VAD method and having a clad/core ratio of 15.6, a relative index difference Δ of the core of 0.35 percent, and an outer diameter of 26 mm was drilled to form holes at the portions to form the side holes.

Figure 10:
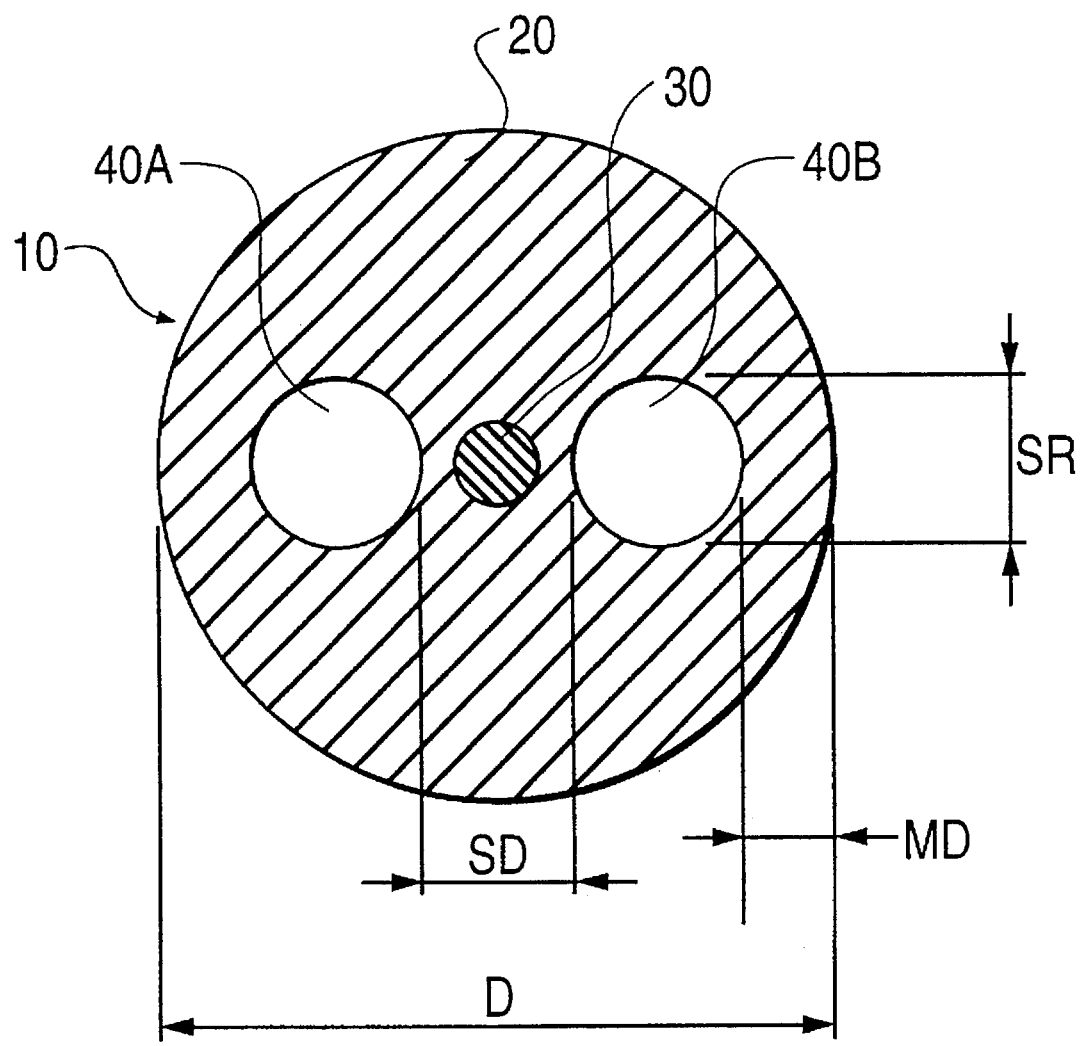
FIG. 10 is a cross-sectional view of an optical fiber preform used in a fifth embodiment of the present invention.

The optical fiber preform resembled the optical fiber shown in FIG. 2, but had the cross-section shown in FIG. 10.

The distance SD between the side holes 40A and 40B of the optical fiber preform 10 was 4 mm, the diameter of the side holes was 6 mm, and the minimum distance MD was 10 mm. The minimum distance MD of the optical fiber preform corresponded to 19 percent of the diameter D of the preform.

Figure 11:
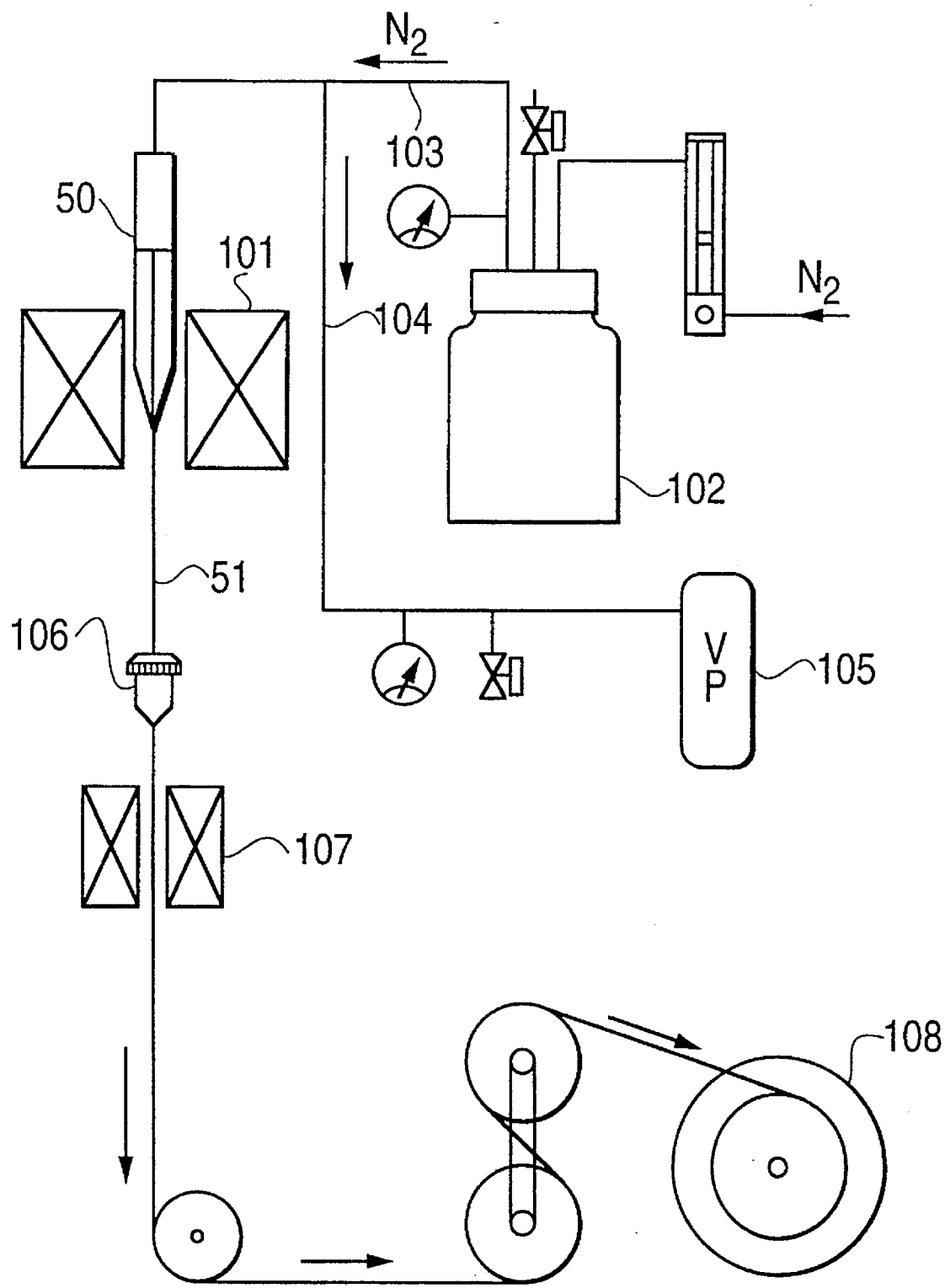
FIG. 11 is a cross-sectional view of an apparatus for drawing an optical fiber from the optical fiber preform shown in FIG. 10.

This optical fiber preform was drawn to an optical fiber using the drawing apparatus shown in FIG. 11.

The optical fiber preform 50 formed with the side holes was inserted in a heating furnace 101. Nitrogen gas of was applied to the side holes through a pressure buffer container 102 and the pressurized pipe 103. Note that a vacuum pump 105 was connected to the side holes of the optical fiber preform 50 through a reduced pressure pipe 10.

The pressurized system and reduced pressure system were adjusted to control the pressure of the nitrogen gas in the side holes of the optical fiber preform 50, the heating temperature of the heating furnace was made 1870° C., and an optical fiber 51 of an outer diameter of 125 μm was drawn at a drawing speed of 20 m/minute. This optical fiber 51 was covered by a plastic covering 106, passed through an ultraviolet ray curing unit 107, and taken up on a takeup roller 108 through dancer rollers etc.

Figure 12:
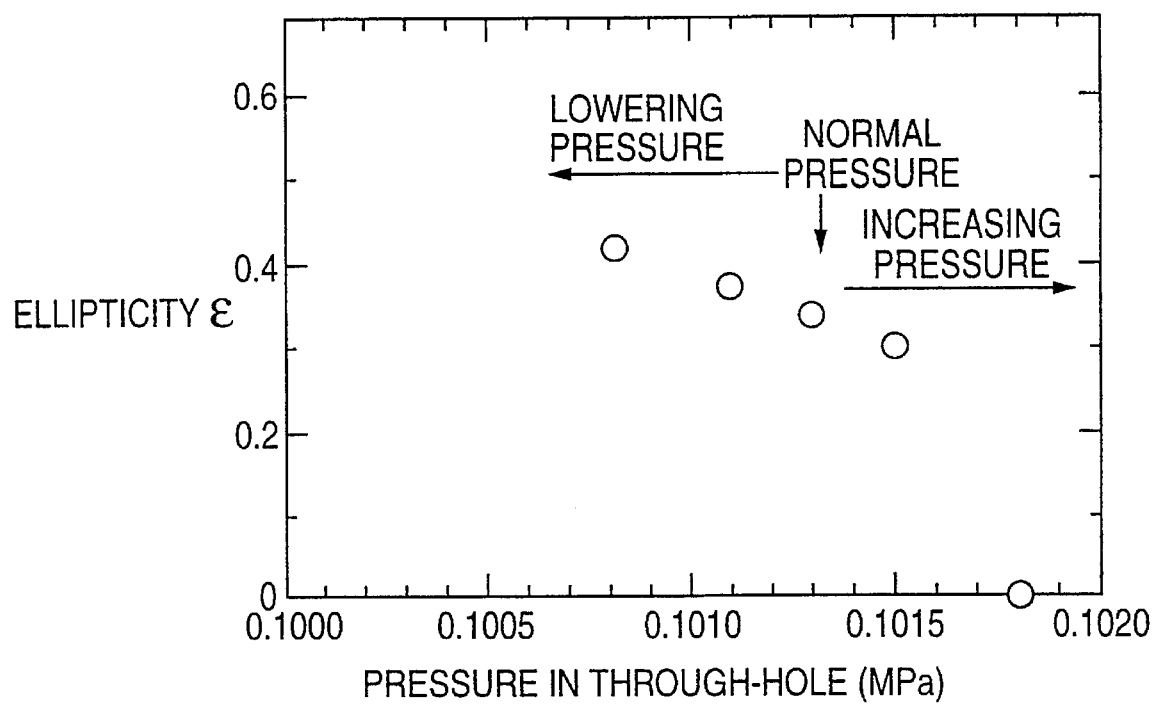
FIG. 12 is a graph showing the relationship between the internal pressure of the through hole of the optical fiber produced by the apparatus of FIG. 11 and the ellipticity of the core.

As shown in FIG. 12, optical fibers with side holes and various core shapes were produced by changing the gas pressure in the side holes of the optical fiber preform 50.

The horizontal axis of FIG. 12 shows the gas pressure at the side holes, while the vertical axis shows the ellipticity of the core. Note that in general the ellipticity ε is shown by the following formula when the short diameter is a and the long diameter is b:

$$\epsilon = 1 - (a/b) \tag{1}$$

When an optical fiber preform having portions to form side holes at the two sides of the portion to form the core is heated in the heating furnace 101 and drawn without applying gas pressure to the insides of the side holes, the side holes are crushed by the surface tension of the glass and the core becomes elliptical. If gas pressure is applied to the portions to form the side holes, however, it is possible to use the gas pressure to control the manner of crushing of the portions to form the side holes. As a result, it is possible to control the shape of the portion to form the core.

The gas pressure in the side holes may be made higher or lower than the outside pressure of the optical fiber preform. If the gas pressure to the side holes is made high, as shown in FIG. 12, the ellipticity ε of the core of the optical fiber produced falls land the core becomes circular. Specifically, when the inner pressure of the side holes(s) is 0.1018 MPa the cross-section of the core becomes perfect circular. Normally most of the optical fibers have circular cores, and then, when producing such optical fibers, the inner pressure of the side holes should be set at 0.1018 MPa. On the contrary, when setting the inner pressure of the side holes at approximately 0.1013 MPa (normal pressure at atmosphere), the ellipticity of the core was approximately 0.33.

The other circumference of the optical fibers obtained here were substantially circular with ellipticities of less than 10 percent in all cases.

Note, the cross-sectional shape of the core is varied in responsive to the value of the inner pressure of the side holes(s), but the outer shape of the optical fiber is hardly changed by the inner pressure of the side holes(s). This means the facility of the connection between the optical fibers is not adversely affected by the producing such optical fibers.

If the gas pressure is gradually changed along the longitudinal direction while drawing the optical fiber preform, however, it is possible to produce an optical fiber with an ellipticity ε of the core which gradually changes along the longitudinal direction of the resultant optical fiber but without substantial change of the outer shape of the optical fiber.

Taking note of the minimum distance MD between the outer circumference of the side holes and the outer circumference of the optical fiber preform, if an optical fiber preform with the minimum distance MD of at least 5 percent of the outer diameter of the optical fiber preform is drawn, no projections or grooves will occur in the outer circumference of the optical fiber at the time of drawing, the outer circumference shape of the optical fiber will be kept substantially circular, and just the shape of the core will change, it was learned.

The minimum distance MD was analyzed in the following way. The minimum distance MD between the outer circumference shape of the side holes and the outer circumference of the optical fiber preform means the minimum thickness of the optical fiber preform around the side holes. If the minimum distance of the optical fiber preform is short, that is, if the thickness of the optical fiber preform is small, then when heating and drawing the optical fiber preform while applying gas pressure to the side holes, the effect of the gas pressure on the outer circumferential shape of the optical fiber preform will be large. As a result, the possibility of occurrence of projections and grooves in the outer circumference shape of the resultant optical fiber will become greater. Conversely, if the minimum distance MD is long, that is, if the minimum thickness of the optical fiber preform is large, the effect of the gas pressure in the side holes acts more on the shape of the core than the outer circumference shape of the optical fiber preform.

As a result of experiments, it was found that the minimum distance MD should be at least 10 percent of the outer circumference of the optical fiber preform.

Further, the drawing temperature of the optical fiber preform in the heating furnace 101 is shown in FIG. 11 preferably a temperature as low a drawing temperature as possible. If the drawing temperature is high, changes easily occur in the outer circumference of the optical fiber preform due to the gas pressure applied to the side holes. The preferably drawing temperature is not more than 2000° C. If the optical fiber preform is drawn at such a drawing temperature, the range of the gas pressure in which no changes occur in the outer circumferential shape of the optical fiber will become larger. In other words, the gas pressure for changing the shape of the core can be set from a broader range.

Comparative Examples

An optical fiber preform similar to the above was drawn by a normal drawing apparatus at a drawing temperature of 1870° C. and a drawing speed of 20 m/minute without applying gas pressure to the side holes to produce an optical fiber of an outer diameter of 125 μm. As a result, the ellipticity of the portion corresponding to the core was 34 percent.

Note that the outer circumferential shapes of the optical fibers of the first experiment were substantially circular with ellipticities in all cases of less than 10 percent.

Figure 13:
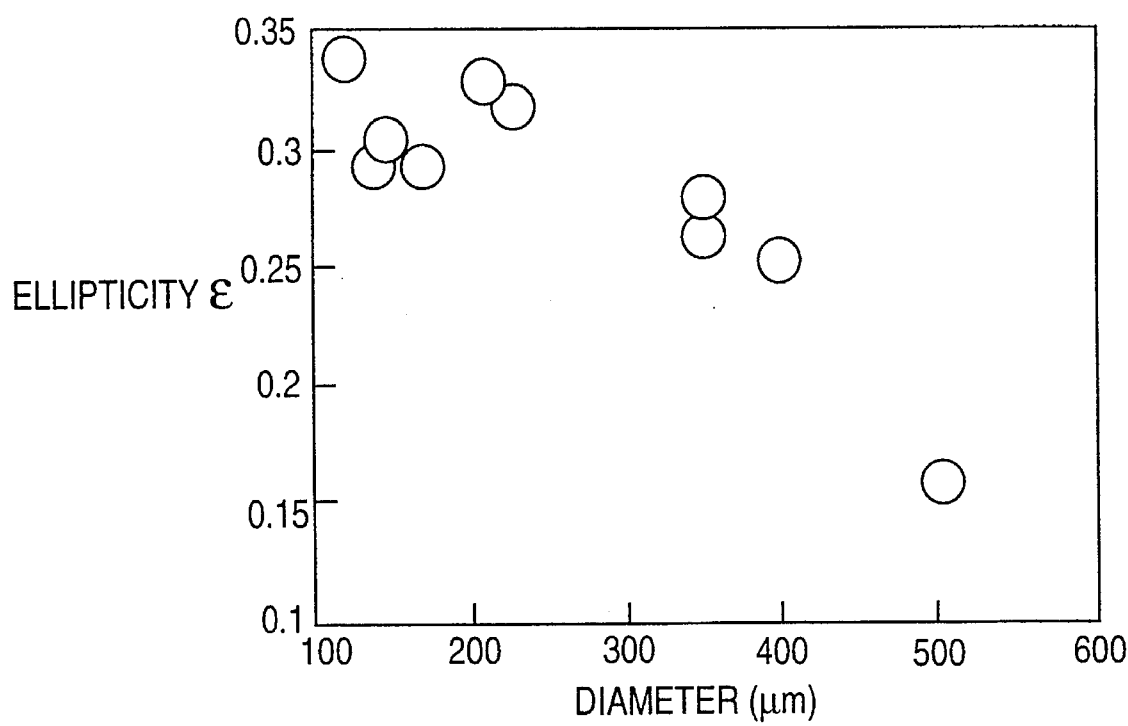
FIG. 13 is a graph showing the relationship between the outer diameter of the optical fiber preform and the ellipticity of the core of the optical fiber which is drawn.

As further comparative examples, optical fibers were drawn under the normal pressure while changing the outer diameter of the optical fiber preform in various ways. The results are shown in FIG. 13. Note the ellipticities of the outer shapes were in all cases were larger than those of the first experiment.

Second Embodiment

A second experiment of the fifth embodiment will be explained next.

A single mode optical fiber preform of quartz glass made by the usual VAD method and having a clad/core ratio of 15.6, a relative refractive index difference Δ of the core of 0.35 percent, and an outer diameter of 26 mm was drilled to form holes at the portions to form the side holes.

The distance between the side holes in the optical fiber preform was 3.3 mm, the diameter of the side holes was 8.8 mm, and the minimum distance was 2.85 mm. The minimum distance MD of the optical fiber preform corresponded to 11 percent of the diameter D of the preform.

This optical fiber preform was drawn to an optical fiber using the drawing apparatus shown in FIG. 11.

The optical fiber preform 50 was inserted in a heating furnace. Nitrogen gas of 26.7 mmHg pressure was filled in the side holes from the above. The preform was drawn to an optical fiber 51 of an outer diameter of 125 μm at a heating temperature of the heating furnace 101 of 1830° C. and a drawing speed of 20 m/minute.

As a result, an elliptical core single mode optical fiber with a distance between side holes of 13.6 μm, a diameter of the side holes of 42 μm, a minimum distance of 13.7 μm, an elliptical shape of core diameters of 6 μm×5 μm, and an ellipticity of 17 percent was produced. The outer circumference shape of the optical fiber was substantially circular with an ellipticity ε of less than 1 percent.

As explained above, according to this embodiment, it is possible to produce an optical fiber having a substantially circular outer circumference shape and a core of any shape.

The optical fiber produced in this way is used to produce the above mode field converting optical fiber. As a result, a higher quality mode field converting optical fiber was produced.

The process of production of the optical fiber of the present invention is not limited to the above embodiments. For example, processes may be used which are equivalent or alternative to the above embodiments.

Further, the above embodiments may be suitably combined.

Further, in the present invention, as explained above, it is possible to produce an optical fiber with an elliptical core at one end from an optical fiber having a circular core and, conversely, produce an optical fiber having a circular core at one end from an elliptical fiber having an elliptical core.

As explained above, according to this process of production of an optical fiber of the present invention, it is possible to produce a mode field converting optical fiber suited to cases where a semiconductor laser etc. is used as the light source.

The optical fiber produced by this process for production of an optical fiber of the present invention has a uniform exterior shape and no change in transmission loss. Further, the reduction in the difference in the indexes of refraction of the core and cladding is small.

We claim:

1. A process of producing an optical fiber comprising a core, the cross-sectional shapes thereof at a portion and another portion being different, said process including the step of heating a first optical fiber at a side thereof, said first optical fiber having a core having a substantially uniform cross-sectional area in a longitudinal direction and a cladding formed with at least one through-hole along the longitudinal direction of said core, to continuously change a shape of said through-hole along the longitudinal direction from the heating portion to the portion where the heat transfer is not substantially subjected, continuously changing the cross-sectional shape of said core along the longitudinal direction from the heating portion to the portion where the heat-transfer is not substantially subjected.

2. A process of producing an optical fiber as set forth in claim 1, wherein in said heat step, the pressure in said through-hole is reduced.

3. A process of producing an optical fiber as set forth in claim 1, wherein said first optical fiber has two through-holes having substantially uniform cross-sectional areas and formed at two sides of said core, producing said optical fiber wherein the cross-sectional shape of the core is changed along the longitudinal direction from the heating portion to the portion where the heat-transfer is not substantially subjected.

4. A process of producing an optical fiber as set forth in claim 1, wherein the initial cross-sectional shape of said core of said first optical fiber before said heating processing is a circle, and wherein said first optical fiber is heated at the side thereof to reduce the cross-sectional shape of said through-hole along the directional toward the other end producing said optical fiber having a circular cross-sectional shape of the core at the portion where the heat-transfer was not substantially subjected and an ellipse cross-sectional shape of the core at the heated portion, the cross-section of the core being continuously changed from the heated portion and the portion where the heat-transfer was not substantially subjected.

5. A process of producing an optical fiber as set forth in claim 1, wherein the cross-sectional shape of said core of said first optical fiber before said heating processing is an ellipse, and wherein said first optical fiber is heated at the side thereof to reduce the cross-sectional shape of said through-hole along the direction toward the other end producing said optical fiber having an ellipse cross-sectional shape of the core at the portion where the heat-transfer was not substantially subjected and a circular cross-sectional shape of the core at the heated portion, the cross-section of the core being continuously changed from the heated portion and the portion where the heat-transfer was not substantially subjected.

6. A process of producing an optical fiber as set forth in claim 4, wherein, after said heat treatment, sealing treatment is applied to seal said reduced or crushed through-hole of said optical fiber at the other end.

7. A process of producing an optical fiber as set forth in claim 6, wherein said sealing treatment comprises connecting a second optical fiber having a cladding portion facing said through-hole of said formed optical fiber for sealing said through hole and a core of a cross-sectional shape the same as said core of said formed optical fiber.

8. A process of producing an optical fiber as set forth in claim 6, wherein said sealing treatment comprises connecting a second optical fiber having the structure substantially equal to that of said first optical fiber and formed by the same material to face the both ends of the cores and do not face the both through-holes.

9. A process of producing an optical fiber as set forth in claim 6, wherein said sealing treatment comprises filling said through hole of said produced optical fiber with a sealing material.

10. A process of producing an optical fiber as set forth in claim 1, wherein second sealing treatment is further applied to seal the portion of said reduced or crushed through-hole at the other end.

11. A process of producing an optical fiber as set forth in claim 10, wherein said second sealing treatment comprises connecting to the other end a third optical fiber having a cladding portion at that other end and a core of a cross-sectional shape the same as the core of said produced optical fiber.

12. A process of producing an optical fiber as set forth in claim 10, wherein the sealing treatment comprises connecting a third optical fiber having the structure substantially equal to that of said first optical fiber at the other end and formed by the same material to face the both ends of the cores and do not face the both through-holes.

13. A process of producing an optical fiber as set forth in claim 4, wherein the core portion at the one end with the circular cross-sectional shape has connected to it a third optical fiber having a core of the same diameter and same material as said core of said formed optical fiber and a cladding of the same material.

14. A process of producing an optical fiber as set forth in claim 5, wherein the core portion at the one end with the elliptical cross-sectional shape has connected to it a third optical fiber having a core of the same cross-sectional shape and same material as said core of said formed optical fiber and a cladding of the same material.

15. An optical fiber produced by heating a first optical fiber comprising a core having a substantially uniform cross-sectional area in a longitudinal direction and a cladding formed with at least one through-hole along the longitudinal directional of said core while heating said first optical fiber along the longitudinal direction thereof continuously changing the cross-sectional shape of said through-hole from the heated portion to the portion where the heat-transfer was not substantially subjected, and thereby continuously change the cross-sectional shape of said core along the longitudinal direction from the heated portion to the portion where the heat-transfer was not substantially subjected.

16. An optical fiber as set forth in claim 15, wherein said first optical fiber has two through-holes having substantially equal cross-sectional areas and formed at two sides.

17. An optical fiber as set forth in claim 15, wherein the initial cross-sectional shape of said core of said first optical fiber before said heating processing is a circle, and wherein, after said heating, the cross-sectional shape of said core at the portion where the heat-transfer was not substantially subjected is a circle, and said through-hole is reduced or crushed along the direction toward the heated portion, to result in the cross-sectional shape of said core at the heated portion being an ellipse.

18. An optical fiber as set forth in claim 15, wherein the initial cross-sectional shape of said core of said first optical fiber before said heating processing is an ellipse, and wherein, after aid heating, the cross-sectional shape of said core at the portion where the heat-transfer was not substantially subjected is an ellipse, and said through-hole is reduced or crushed along the direction toward the heated portion to result in the cross-sectional shape of said core at the heated portion being a circle.

19. An optical fiber as set forth in claim 17, having a member sealing said through-hole at the one end.

20. An optical fiber as set forth in claim 19, wherein as said sealing member, a second optical fiber having a cladding portion facing said through-hole for sealing said through-hole and a core of a cross-sectional shape the same as said core is connected.

21. An optical fiber as set forth in claim 19, wherein as said sealing member, a second optical fiber having the structure substantially equal to that of said first optical fiber and formed by the same material is connected to said produced optical fiber to face the both ends of the cores and do not face the both through-holes.

22. An optical fiber as set forth in claim 19, wherein as said sealing member, a sealing material is filled in said through-hole.

23. An optical fiber as set forth in claim 19, wherein there is further a second sealing member sealing said reduced or crushed through-hole at the other end.

24. A process of producing an optical fiber comprising a core, the cross-sectional shapes thereof at the portion and another portion being different, said processing including the steps of:

forming an optical fiber preform, having a first portion to form a core of said optical fiber and a second portion which to form a cladding having at least one through-hole formed along said first portion to form said core, so that the minimum distance between the outer circumference of said through-hole and the outer circumference of said optical fiber preform becomes at least a predetermined magnitude;

applying gas to give pressure to said through-hole in the optical fiber preform; and drawing said optical fiber preform at a temperature of a predetermined range of a drawing temperature.

25. A process of producing an optical fiber as set forth in claim 24, wherein said minimum distance is at least 10 percent of a diameter of said optical fiber preform.

26. A process of producing an optical fiber as set forth in claim 24, wherein said drawing temperature is set to at a certain temperature between 1800° C. and 2000° C.

27. A process of producing an optical fiber as set forth in claim 24, wherein the gas pressure applied to said through-hole is made high when making the cross-sectional shape of said core circular and is made lower when making the cross-sectional shape of the core elliptical.

28. A process of producing an optical fiber as set forth in claim 27, wherein the cross-sectional shape of said core at one end is made circular, the cross-sectional shape of said core at the other end is made elliptical, and an intermediate portion is formed so that the core portion of the circular shape at the one end and the core portion of the elliptical shape at the other end are continuously connected.

29. An optical fiber comprising a core, the cross-sectional shapes thereof at a portion and another portion being different, produced by forming an optical fiber preform, having a first portion to form a core of said optical fiber and a second portion which to form a cladding having at least one through-hole formed along said first portion to form said core, so that the minimum distance between the outer circumference of said through-hole and the outer circumference of said optical fiber preform becomes at least a predetermined magnitude, applying gas pressure to said through-hole in said optical fiber preform, and drawing said optical fiber preform at a temperature of a predetermined range of a drawing temperature.

30. An optical fiber as set forth in claim 29, wherein said minimum distance is at least 10 percent of a diameter of said optical fiber preform.

31. An optical fiber as set forth in claim 30, wherein the cross-sectional shape of said core at one end is made circular, the cross-sectional shape of said core at the other end is made elliptical, and an intermediate portion is formed so that the core portion of the circular shape at the one end and the core portion of the elliptical shape at the other end are continuously connected.

* * * * *